UNITED STATES PATENT OFFICE.

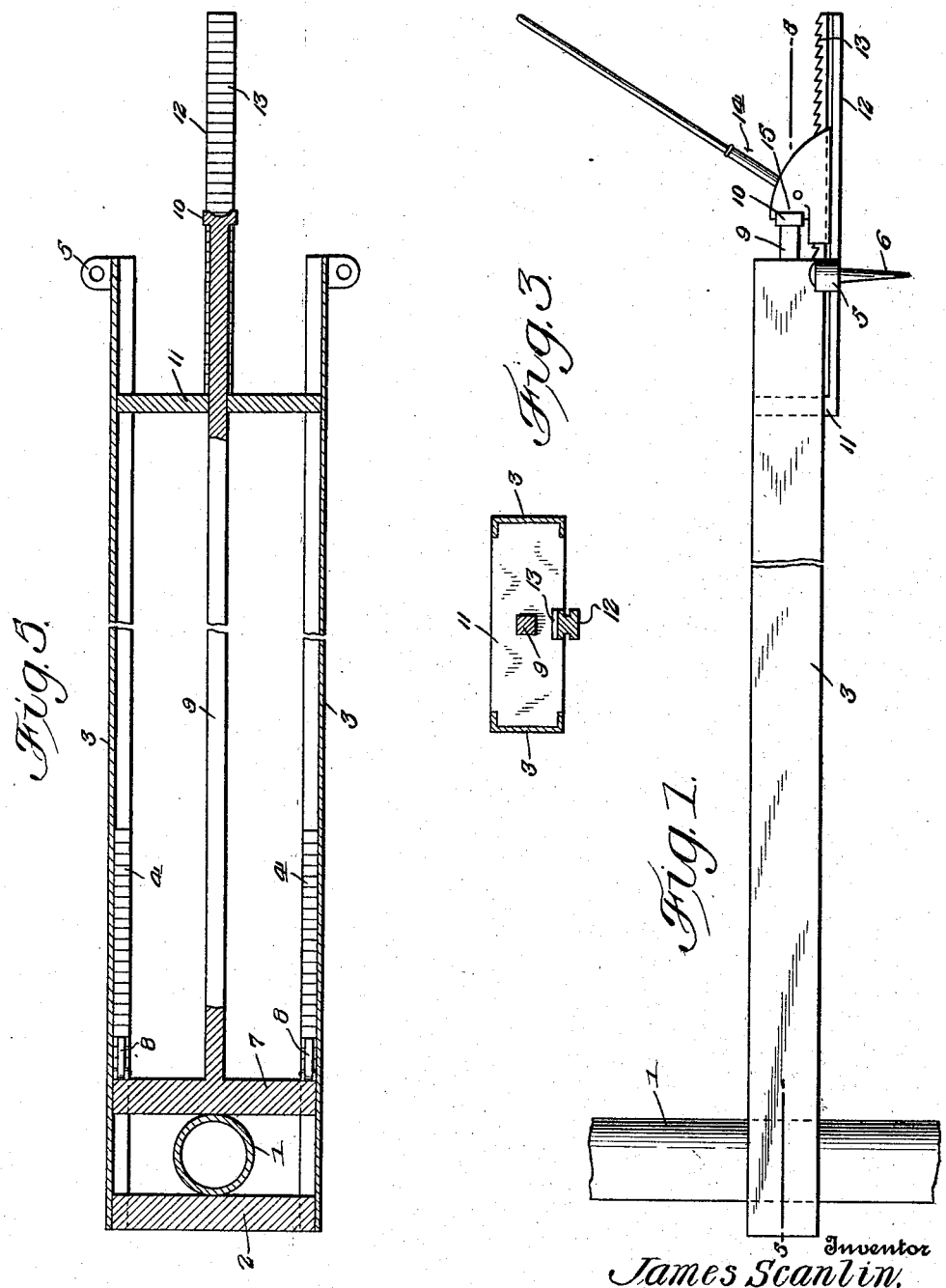

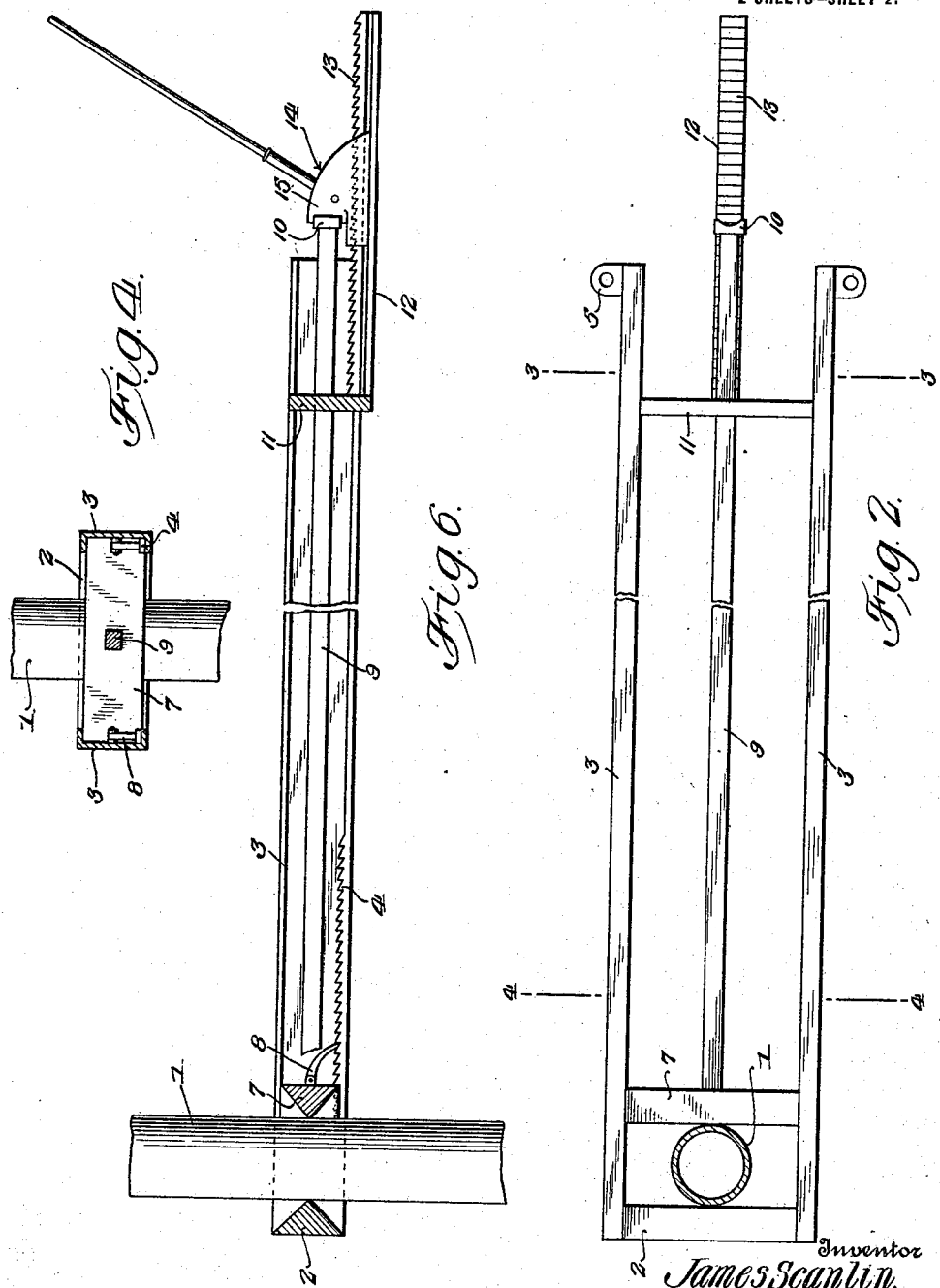

JAMES SCANLIN, OF WIRT, OKLAHOMA, ASSIGNOR OF ONE-HALF TO PAUL A. ARNOLD AND G. D. CHASTAIN, BOTH OF WIRT, OKLAHOMA.

OIL-CASING-CLOSING APPARATUS.

1,217,837.      Specification of Letters Patent.      Patented Feb. 27, 1917.

Application filed October 25, 1916. Serial No. 127,626.

*To all whom it may concern:*

Be it known that I, JAMES SCANLIN, a citizen of the United States, residing at Wirt, in the county of Carter and State of Oklahoma, have invented new and useful Improvements in Oil-Casing-Closing Apparatus, of which the following is a specification.

The present invention relates to what may be termed an emergency device for oil well tubes or casings, and is designed to be operated should the oil be ignited or the seriously obnoxious gases escape from the casing, for bulging or compressing the walls of the casing toward each other or close the outflow of the oil and consequently extinguish the fire from the oil, and likewise to prevent the escape of the obnoxious gases from the tube or casing.

In carrying out my invention, it is my purpose to arrange around the tube or casing of an oil well a stationary member and a movable member, mechanism being provided at a remote or safe point away from the oil casing for actuating the movable member to force the same toward the stationary member to bulge or compress the casing to close the opening therein.

It is a further object of the invention to produce a device of this character which shall be simple, cheap, readily installed and easily and quickly operated without danger to the operator.

With the above and other objects in view, the improvement resides in the construction, combination and arrangement of parts set forth in the following specification and falling within the scope of the appended claims.

In the drawings:

Figure 1 is a side elevation illustrating the application of the improvement;

Fig. 2 is a top-plan view of the same;

Fig. 3 is a transverse sectional view approximately on line 3—3 of Fig. 2;

Fig. 4 is a similar sectional view approximately on line 4—4 of Fig. 2; and

Fig. 5 is a horizontal sectional view approximately on line 5—5 of Fig. 1.

Fig. 6 is a longitudinal section on a vertical plane at one side of the middle line of the apparatus.

Referring to the drawings in detail, the numeral 1 designates an oil casing, providing the outlet from an oil well.

My improvement contemplates the employment of a head 2 which is disposed to one of the sides of the casing 1, and is adapted to contact with the said casing. The head may be V-shaped in cross section, or may be provided with teeth whereby the same may be embedded within the casing, for a purpose which will presently be apparent. To the opposite sides of the head 1 are provided longitudinally extending arms 3—3. Each of the arms 3 provides channel members, the inner faces of the said members being open and the lower horizontal wall of each of the channels is provided with a series of teeth 4. It is to be understood that the arms are of a sufficient length to have their ends terminate a suitable distance away from the casing 1, and the said ends of the arms are provided with eyes 5 for the reception of anchor members 6, whereby the head 2 is sustained in proper contacting relation with the casing 1 and also whereby the arms 3 as well as the head 2 are prevented from movement in either direction with respect to the casing 1.

The numeral 7 designates what I will term a plunger member, and the upper face of the same may be sharpened or the same may be substantially V-shaped in cross section. The ends of the member 7 are adapted to be received in the channels of the arms 3, the said ends being provided with gravity pawls 8 which are adapted to contact with the teeth 4 to prevent outward movement of the member 7 through the arms 3. The stem for the plunger is indicated by the numeral 9 and the outer end of the same is provided with a head 10.

Secured between the arms 3, not interfering with the channels therein is a combined brace and guide member 11, the same being provided with an opening through which the stem 9 of the plunger 7 passes. To the guide member 11 is centrally secured an outwardly extending longitudinally arranged track 12, the same being preferably provided with teeth 13, and this track is adapted to provide a rest for a jack 14, and the head 15 of this jack is adapted to engage with the head 10 of the stem 9 of the plunger member 7, whereby, upon the actuation of the jack the plunger will be forced into striking engagement with the side of the casing 1 and compress the said casing and close the bore thereof so that should the oil, passing through the casing be ignited the flame thereof can be thus readily extinguished. Furthermore, should the gases escaping through the casing become seriously obnoxious the outflow of the said gases can be thus prevented.

As stated, the operating means for the device is adapted to be disposed a suitable and safe distance away from the casing, and the operation and advantages of the construction will, it is thought, be apparent without further detailed description.

Having thus described the invention, I claim:

1. In an apparatus for compressing the casing of an oil well from the opposite sides thereof to close the bore of the said casing, a headed member disposed to one of the sides of the casing, arms extending from the said headed member, anchoring means for the arms, a movable member between the arms, and means for actuating the movable member to cause the same to contact with and compress the casing to close the bore of the casing.

2. In an apparatus for bulging an oil well casing to close the bore thereof, comprising a head member having a sharpened engaging surface disposed to contact with one of the sides of the casing, oppositely disposed arms extending longitudinally from the sides of the head and having their inner faces channeled and the lower walls of the channel provided with teeth, anchor members for the arms to sustain the head in contact with the casing, a plunger member having its ends received in the channels of the arms, bolts upon the plunger engaging with the teeth of the channeled arms, a stem for the plunger, a guide between the arms for the stem, and means, comprising mechanism contacting with the stem for forcing the same toward the head and against the casing, to compress and inwardly bulge the casing to close the bore thereof.

3. In a means for compressing the casing of an oil well for closing the bore thereof, a headed member having a sharpened face disposed to contact with one of the sides of an oil well casing, channeled arms extending from the head, teeth within the channels, anchor members for the arms, a guide member between the arms, a track upon the guide members extending outwardly of the arms, a plunger having a sharpened end disposed between the arms, bolts upon the plunger engaging with the teeth of the channeled arms, a stem for the plunger passing through the guide between the arms, a head for the outer end of the plunger, and means comprising mechanism arranged upon the track and coacting with the head of the stem for forcing the plunger toward the casing to bulge the said casing inwardly and close the bore thereof.

4. In a device for closing the casing of an oil well, a member engaging one of the sides of the casing, guide arms upon the member, anchoring means for the guide arms, a plunger between the arms, means between the plunger and the said arms for sustaining the same against movement in one direction, and means, comprising mechanism for forcing the plunger toward the head into contact with the casing, to bulge the said casing and close the bore thereof.

In testimony whereof I affix my signature.

JAMES SCANLIN.

Copies of this patent may be obtained for five cents each, by addressing the "Commissioner of Patents, Washington, D. C."